(12) United States Patent
Webster et al.

(10) Patent No.: US 9,247,069 B1
(45) Date of Patent: Jan. 26, 2016

(54) MODEM CALL FORWARDING AND THREE-WAY CALLING FEATURES FOR VOIP APPLICATIONS

(75) Inventors: Andrew B. Webster, Irvine, CA (US); Eitan David, Irvine, CA (US); Stephen J. McIntyre, Irvine, CA (US)

(73) Assignee: CONEXANT SYSTEMS, INC., Newport Beach, CA (US)

(*) Notice: Subject to any disclaimer, the term of this patent is extended or adjusted under 35 U.S.C. 154(b) by 3080 days.

(21) Appl. No.: 11/438,009

(22) Filed: May 19, 2006

(51) Int. Cl.
*H04M 3/56* (2006.01)
*H04M 3/527* (2006.01)
*H04M 11/06* (2006.01)

(52) U.S. Cl.
CPC .................................... *H04M 3/568* (2013.01)

(58) Field of Classification Search
CPC ......... G10L 19/00; H04W 4/16; H04M 3/568
USPC ........................................................ 370/352
See application file for complete search history.

(56) References Cited

U.S. PATENT DOCUMENTS

| | | | |
|---|---|---|---|
| 2001/0015981 A1* | 8/2001 | Nelson et al. ................. | 370/410 |
| 2001/0021248 A1* | 9/2001 | Utsumi .................... | 379/265.02 |
| 2002/0032875 A1* | 3/2002 | Kashani ........................ | 713/300 |
| 2002/0085488 A1* | 7/2002 | Kobayashi .................... | 370/216 |
| 2002/0108484 A1* | 8/2002 | Arnold et al. .................. | 84/615 |
| 2003/0053451 A1* | 3/2003 | Medhat ......................... | 370/357 |
| 2004/0018848 A1* | 1/2004 | Ogino et al. .................. | 455/519 |
| 2004/0198328 A1* | 10/2004 | Brandenberger .......... | 455/414.1 |
| 2004/0203373 A1* | 10/2004 | Ogino et al. ................. | 455/41.2 |
| 2004/0266418 A1* | 12/2004 | Kotzin .......................... | 455/420 |
| 2005/0234727 A1* | 10/2005 | Chiu .......................... | 704/270.1 |
| 2006/0153354 A1* | 7/2006 | Brahm et al. ............ | 379/211.02 |
| 2006/0187900 A1* | 8/2006 | Akbar ........................... | 370/352 |
| 2007/0025338 A1* | 2/2007 | Benditovich et al. ......... | 370/352 |

* cited by examiner

*Primary Examiner* — Jason Harley
(74) *Attorney, Agent, or Firm* — Haynes and Boone, LLP

(57) ABSTRACT

There is provided a method of establishing voice communications over a packet network using a first computer having a first VoIP application, a first modem, a first modem audio subsystem, a microphone and a speaker. The method comprises establishing a VoIP connection with a second VoIP application using the first VoIP application; making a phone connection over a phone line using the first modem; placing the first modem in an audio mode; enabling the first modem audio subsystem to provide a voice communication path between the first modem and the first VoIP application; mixing an audio stream received from the first modem with an audio stream received from the microphone to generate a first mix; and sending the first mix to the first VoIP application.

22 Claims, 9 Drawing Sheets

MODEM CALL FORWARDING AND THREE-WAY CALLING FEATURES FOR VOIP APPLICATIONS

RELATED APPLICATIONS

The present application is related to U.S. patent application Ser. No. 11/438,005, titled "Telephone Directory Synchronization for VoIP Applications," filed concurrently with the present application, is incorporated by reference in its entirety and made part of the present application.

BACKGROUND OF THE INVENTION

1. Field of the Invention

The present invention relates generally to voice over packet network. More particularly, the present invention relates to utilizing modems to implement call forwarding and three-way calling features for VoIP applications.

2. Background Art

Voice over Internet Protocol (or VoIP), also known as IP Telephony, Internet telephony and Digital Phone, is a technology for the routing of voice conversations over the Internet or any other packet-based network. The voice data flows over a general-purpose packet-switched network, instead of traditional dedicated, circuit-switched voice transmission lines. In addition to providing an alternative for voice conversations over the traditional phone networks, VoIP can also facilitate tasks that are difficult to achieve using the traditional phone networks. For example, incoming phone calls can be automatically routed to VoIP applications or phones, irrespective of where the user is connected to the network. As another example, VoIP applications or phones can integrate with other services available over the Internet, such as video conversation, message or data file exchange in parallel with the conversation, audio conferencing, managing address books and passing information about whether others (e.g. friends or colleagues) are available online to interested parties.

Today, VoIP providers are increasingly taking market shares away from the providers of traditional circuit-switched voice transmission lines. For example, standalone VoIP phone service providers, such as Vonage Corporation use an existing high-speed Internet connection to make and receive phone calls worldwide with a touch-tone telephone as a feature-rich and cost effective alternative to traditional telephony services. Also, PC-centric VoIP providers, such as Skype Technologies, enable PC users to make and receive telephone calls through their PCs.

FIG. 1 illustrates conventional VoIP system 100, which includes packet network 130 at its core for facilitating communications between first computer 110 and second computer 150, where the computers can be standalone VoIP devices or PC-centric VoIP applications, and the like. As shown, first speech encoder/decoder 120 is located in first computer 110 and interposed between first VoIP application 115 and packet network 130, and second speech encoder/decoder 140 is located in second computer 150 and interposed between second VoIP application 155 and packet network 130. Each of first speech encoder/decoder 120 and second speech encoder/decoder 140 performs the tasks of receiving a speech signal from its corresponding user device, digitizing the speech signal, encoding or compressing the digitized speech signal, packetizing the compressed speech signal and transmitting speech packets over packet network 130 in one direction, and in the other direction, receiving speech packets over packet network 130, depacketizing the compressed speech signal, decoding or decompressing the depacketized speech signal to retrieve the digitized speech signal to regenerate the speech signal and transmitting the speech signal to its corresponding user device.

Conventionally, first computer 110 and second computer 150 also include first VoIP application 115 and second VoIP application 155, respectively. For example, first VoIP application 115 is loaded into a memory of first computer 110 and is used as an interface to first speech encoder/decoder 120 and first computer audio subsystem 116, where first computer audio subsystem 116 communicates with first computer microphone 101 and first computer speaker 102. Similarly, second VoIP application 155 is loaded into a memory of second computer 150 and is used as an interface to second speech encoder/decoder 140 and second computer audio subsystem 156, where second computer audio subsystem 156 communicates with second computer microphone 151 and first computer speaker 152. First VoIP application 115 may include (a) a voice processing module, which prepares voice samples for transmission over packet network 130, which may run on a DSP; (b) a call processing (or signaling) module, which allows calls to be established across packet network 130; (c) a packet processing module, which processes voice and signaling packets, adding the appropriate transport headers prior to submitting the packets to packet network 130; and (d) a network management module, which provides management agent functionality, allowing remote fault, accounting, and configuration management to be performed from standard management systems, and may include ancillary services such as support for security features, access to dialing directories, and remote access support.

Today, conventional VoIP applications provide a call forwarding feature to forward a VoIP call to a user's phone, such as a cell phone, over a PSTN phone line, when the user is unable to answer the VoIP call using its VoIP terminal. However, the VoIP providers offer such call forwarding feature to their users at an additional charge, since the VoIP providers incur additional costs for use of the PSTN phone line.

Further, today, conventional VoIP applications provide a three-way calling feature, such that more than two VoIP users can participate during a VoIP call. However, such three-way calling feature requires that all participants to join the VoIP call through their VoIP applications. The conventional VoIP applications offer no solution for a three-way calling when a user has no access to a VoIP terminal. In addition, the three-way calling feature offered by PSTN phone line providers also fails to offer a solution when the participants desire to join a third participant that does not have an access to a PSTN phone line through a cell phone or a wireline phone.

In addition, today, a VoIP application may be used to forward a call originating from a PSTN phone line over the VoIP network. However, in order to connect to a remote VoIP user, the originating user must dial the PSTN phone number for the VoIP application and upon receiving a prompt, send DTMF digits indicative of the remote user's identification number in the VoIP application. However, it is very difficult and impractical for the originating user to memorize each and every identification number associated with remote users in the VoIP application.

Accordingly, there is a strong need in the art to remedy the aforementioned shortcomings, and further facilitate an interconnection between the VoIP network and the PSTN network to provide more features and transparency for the users.

SUMMARY OF THE INVENTION

The present invention is directed to methods and systems for establishing voice communications over a packet network using a first computer having a first VoIP application, a first modem, a first modem audio subsystem, a microphone and a speaker. In one aspect, a method comprises establishing a VoIP connection with a second VoIP application using the first VoIP application; making a phone connection over a phone line using the first modem; placing the first modem in an audio mode; enabling the first modem audio subsystem to provide a voice communication path between the first modem and the first VoIP application; mixing an audio stream received from the first modem with an audio stream received from the microphone to generate a first mix; and sending the first mix to the first VoIP application.

In a further aspect, the method may comprise mixing the audio stream received from the first modem with an audio stream received from the first VoIP application to generate a second mix; sending the second mix to the speaker; mixing the audio stream received from microphone with the audio stream received from the first VoIP application to generate a third mix; sending the third mix to the first modem.

In an additional aspect, prior to making the phone connection, the method further comprises dialing a phone number over the phone line using the first modem or answering a call received over the phone line using the first modem. For example, in one aspect, the phone connection occurs prior to the VoIP connection.

In a separate aspect, there is provided a method of establishing voice communications over a packet network using a first computer having a first VoIP application, a first modem, a microphone and a speaker. The method comprises establishing a VoIP connection with a second VoIP application using the first VoIP application; determining that the VoIP connection is to be forwarded via a phone line to a first user; requesting the first modem to dial a phone number for the first user in response to determining that the VoIP connection is to be forwarded; determining whether the phone line is in use by a second user using the first modem; dialing the phone number using the first modem only if the first modem determines that the phone line is not in use; making a phone connection over a phone line using the first modem; and providing a voice communication path between the first modem and the first VoIP application.

In one aspect, if the first modem determines that the phone line is in use by the second user, the second user is alerted about the VoIP connection.

In another aspect, after providing the communication path, the method further comprises monitoring the phone line using the first modem to determine if a communication device connected to the phone line goes off-hook. Further, monitoring the phone line may determine that the communication device connected to the phone line has gone off-hook, and the method may further comprise alerting the communication device that the VoIP connection is in progress; and inquiring whether the communication device is to join the VoIP connection. In addition, monitoring the phone line determines that the communication device connected to the phone line has gone off-hook, and the method may further comprise alerting users of the VoIP connection that the communication device has gone off-hook; and inquiring whether the communication device is to join the VoIP connection.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
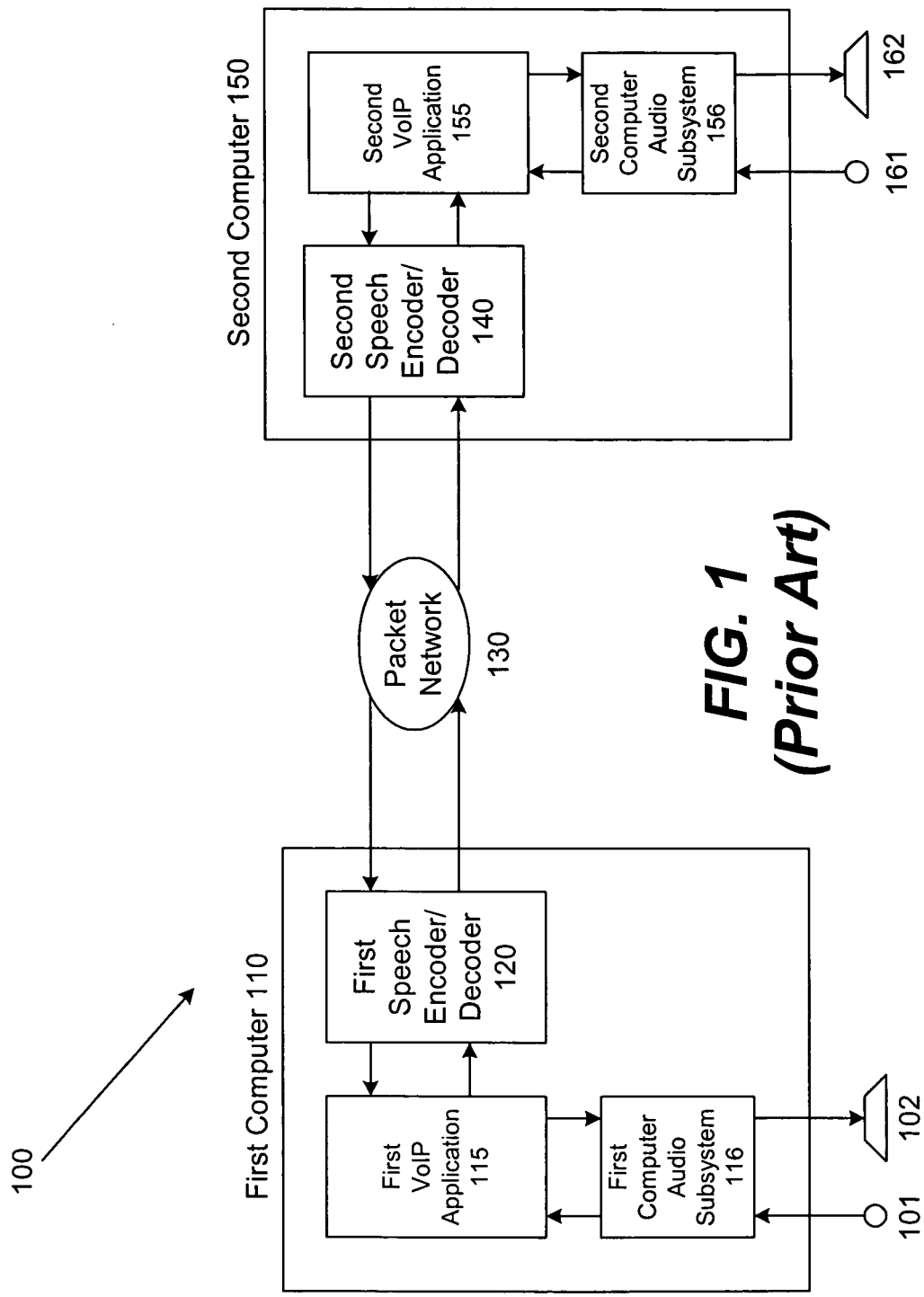
FIG. 1 illustrates a conventional VoIP system facilitating VoIP communications between computers.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
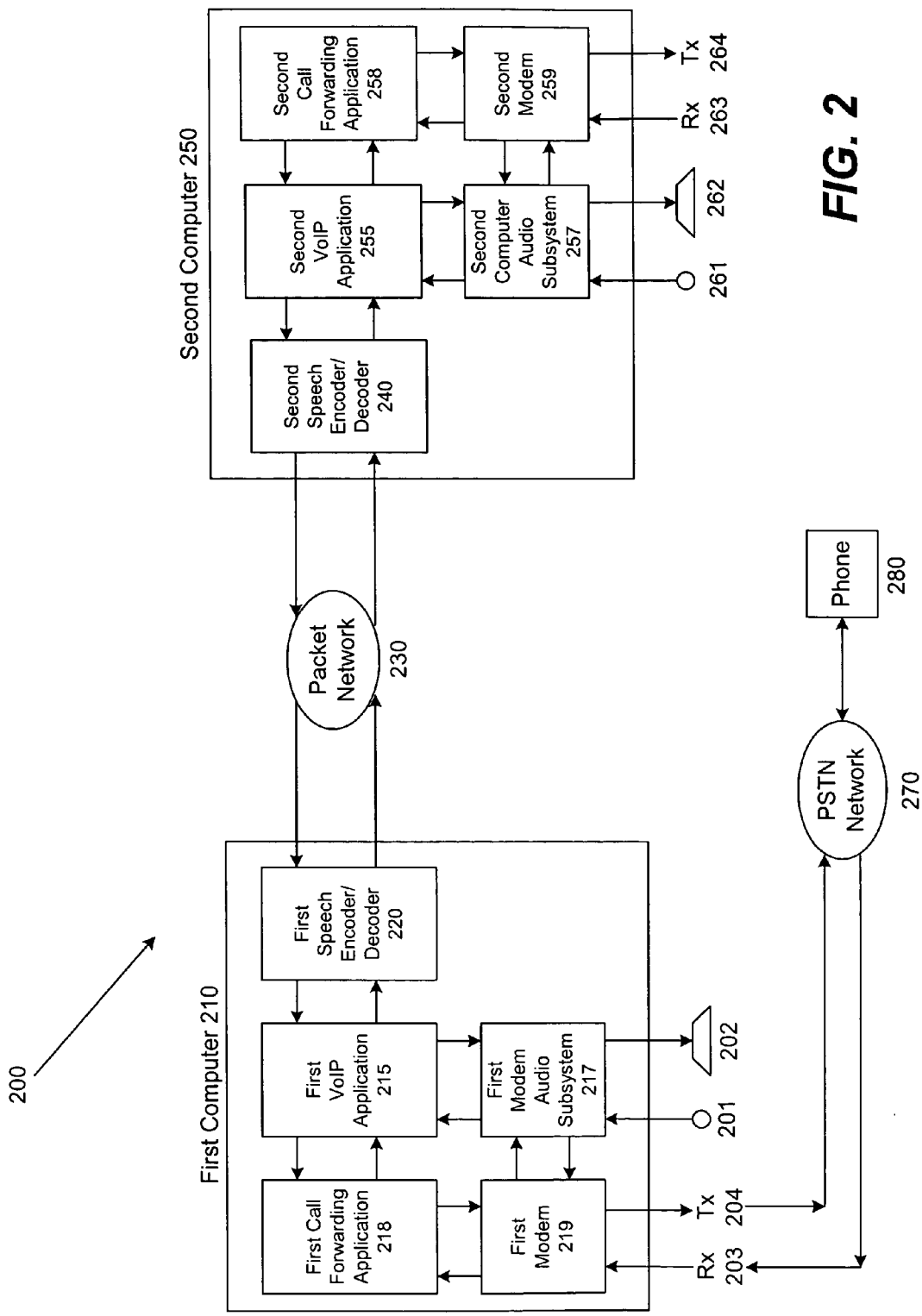
FIG. 2 illustrates a VoIP system using modems to facilitate an interconnection between the VoIP network and the PSTN network, according to one embodiment of the present invention.

FIG. 2 illustrates VoIP system 200 according to one embodiment of the present invention, which includes packet network 230 at its core for facilitating communications between first computer 210 and second computer 250, where the computers can be standalone VoIP devices or PC-centric VoIP applications, and the like. As shown, first speech encoder/decoder 220 is located in first computer 210 and interposed between first VoIP application 215 and packet network 230, and second speech encoder/decoder 240 is located in second computer 250 and interposed between second computer 250 and packet network 230. In some embodiments, first speech encoder/decoder 220 and second speech encoder/decoder 240 are integrated within first VoIP application 215 and second VoIP application 255, respectively. Each of first speech encoder/decoder 220 and second speech encoder/decoder 240 performs the tasks of receiving a speech signal from its corresponding user device, digitizing the speech signal, encoding or compressing the digitized speech signal, packetizing the compressed speech signal and transmitting speech packets over packet network 230 in one direction, and in the other direction, receiving speech packets over packet network 230, depacketizing the compressed speech signal, decoding or decompressing the depacketized speech signal to retrieve the digitized speech signal to regenerate the speech signal and transmitting the speech signal to its corresponding user device. First computer 210 includes first VoIP application 215, first modem audio subsystem 217, first call forwarding application 218 and first modem 219. Similarly, second computer 250 includes second VoIP application 255, second modem audio subsystem 257, second call forwarding application 258 and second modem 259.

Figure 3:
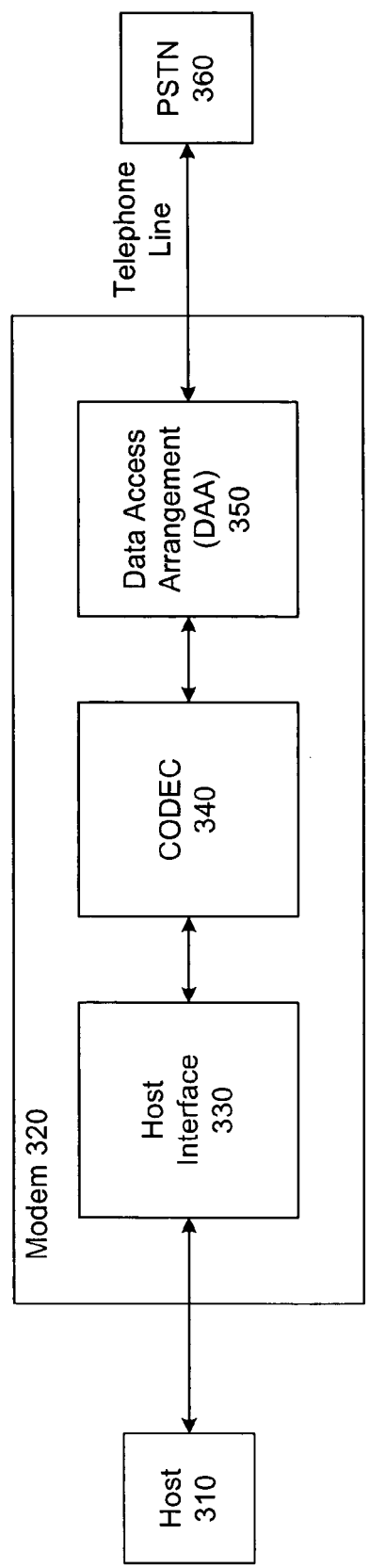
FIG. 3 illustrates a modem for use in the VoIP system of FIG. 2.

FIG. 3 illustrates modem 320 for use in VoIP system 200 as first modem 219 or second modem 259, according to one embodiment of the present invention. As shown, modem 320 includes host interface 330 for interfacing with host 310, such as first computer 210 or second computer 250. In one embodiment, host interface may be a computer bus interface. In yet another embodiment, host interface may be a serial interface, such as an RS232 interface. Further, modem 320 includes codec 340 for coding a signal for transmission over PSTN 360 to phone 280, and for decoding a signal received over PSTN 360. In addition, modem 320 includes data access arrangement (DAA) 350 for interfacing with the telephone line for communication over PSTN 360. It should be noted that in one embodiment, DSP and controller functions of modem 320 may be performed by host 310; however, in other embodiments either or both DSP and controller functions may be performed by modem 320. Further, modem 320 includes an audio mode for transmitting an audio stream from host 310 over PSTN 360 and for transmitting an audio stream to host 310 based on signals received over PSTN 360. Also, in one embodiment, modem 320 may include data and facsimile functions in addition to the audio function. In another embodiment, modem 320 may include a speakerphone mode, and modem 320 uses the speakerphone mode of the modem as the audio mode. In the speakerphone mode, modem 320 may enable an echo canceller. In one embodiment, modem 320 may enter the speakerphone mode, but disable the echo canceller if the VoIP application is running.

Figure 4:
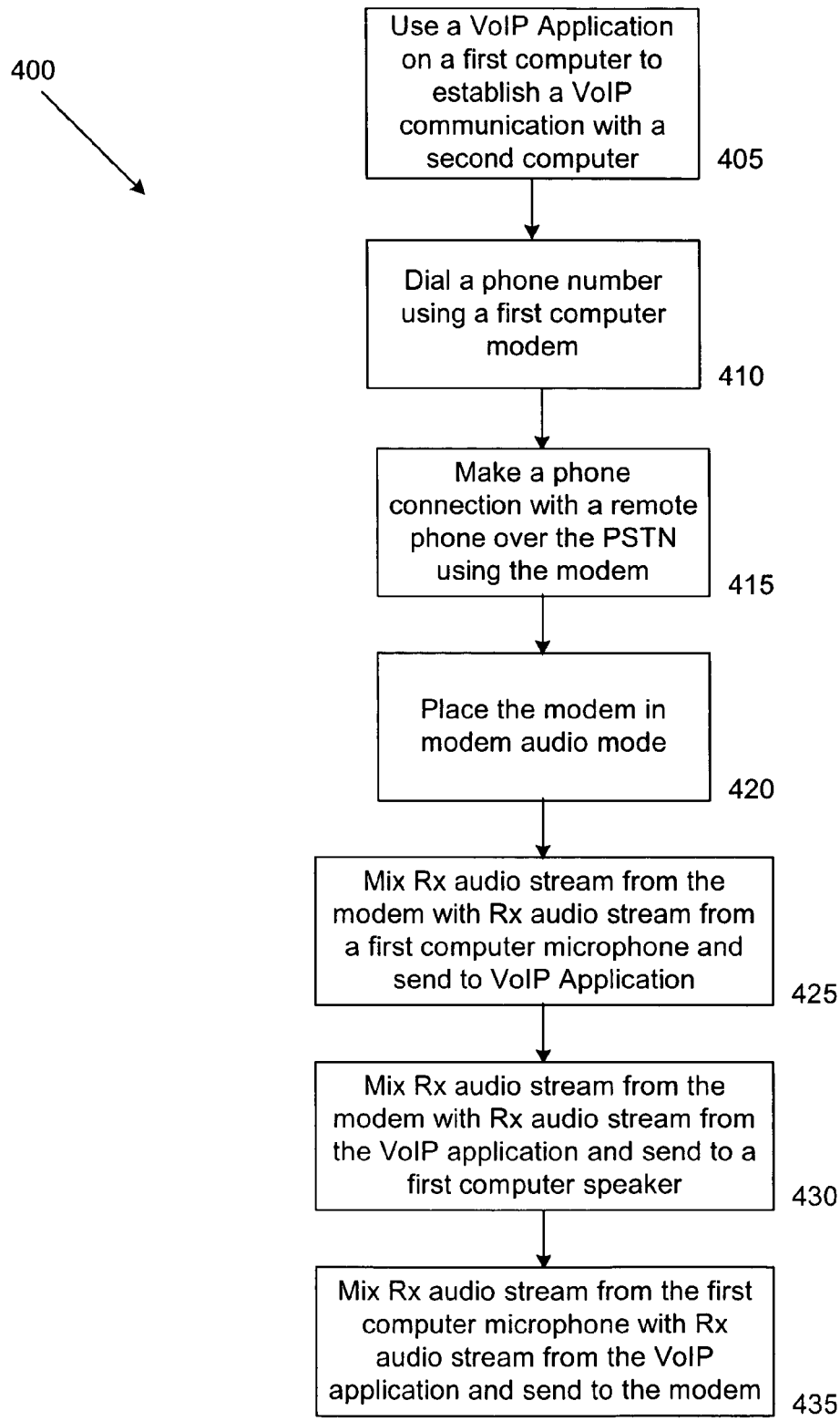
FIG. 4 illustrates a flow diagram of a VoIP call forwarding method over the PSTN network for use by the VoIP system of FIG. 2, according to one embodiment of the present invention.

FIG. 4 illustrates a flow diagram of VoIP call forwarding method 400 over PSTN network 270 for use by VoIP system 200, according to one embodiment of the present invention. At step 405, first VoIP application 215 establishes a VoIP connection with second VoIP application 255 establishes over packet network 230. Next, users of first VoIP application 215 and second VoIP application 255 may desire to add a third participant to the VoIP connection. However, if the third participant cannot be reached over packet network 230, at step 410, the user of first computer 210 may request first computer 210 to contact the third participant over a PSTN phone line, and first computer 210 may use first modem 219 to dial a phone number of the participant on the PSTN phone line. At step 415, the third participant answers the PSTN call using a wireless or a wireline communication device, such as phone 280. At step 420, first computer 210 places modem 219 in the audio mode, such that the audio stream is communicated between phone 280 and first VoIP application 215 via modem 219 over PSTN network 270. In addition, first computer 210 replaces the first computer audio subsystem with first modem audio subsystem 217.

In order to facilitate a three-way conversation over packet network 230, at step 425, first modem audio subsystem 217 mixes the audio stream received from first modem 219, which is based on Rx signal 203, with the audio stream received from microphone 201, and sends this mixed audio stream to first VoIP application 215 for transmission over packet network 230. Furthermore, at step 430, first modem audio subsystem 217 mixes the audio stream received from first modem 219, which is based on Rx signal 203, with the audio stream received from first VoIP application 215, and sends this mixed audio stream to speaker 202. Also, at step 435, first modem audio subsystem 217 mixes the audio stream received from microphone 201 with the audio stream received from first VoIP application 215, and sends this mixed audio stream to first modem 219 for transmission via Tx signal 204 to phone 280 over PSTN network 270. In one embodiment, as part of mixing the audio streams, first modem audio subsystem 217 may apply adaptive gain control (AGC) to the audio stream based on the source. For example, first modem audio subsystem 217 may apply AGC to drop the audio level for the audio stream from microphone 201 prior to mixing with the audio stream from received from first modem 219, or may increase the audio level for the audio stream received from first modem 219.

Figure 5:
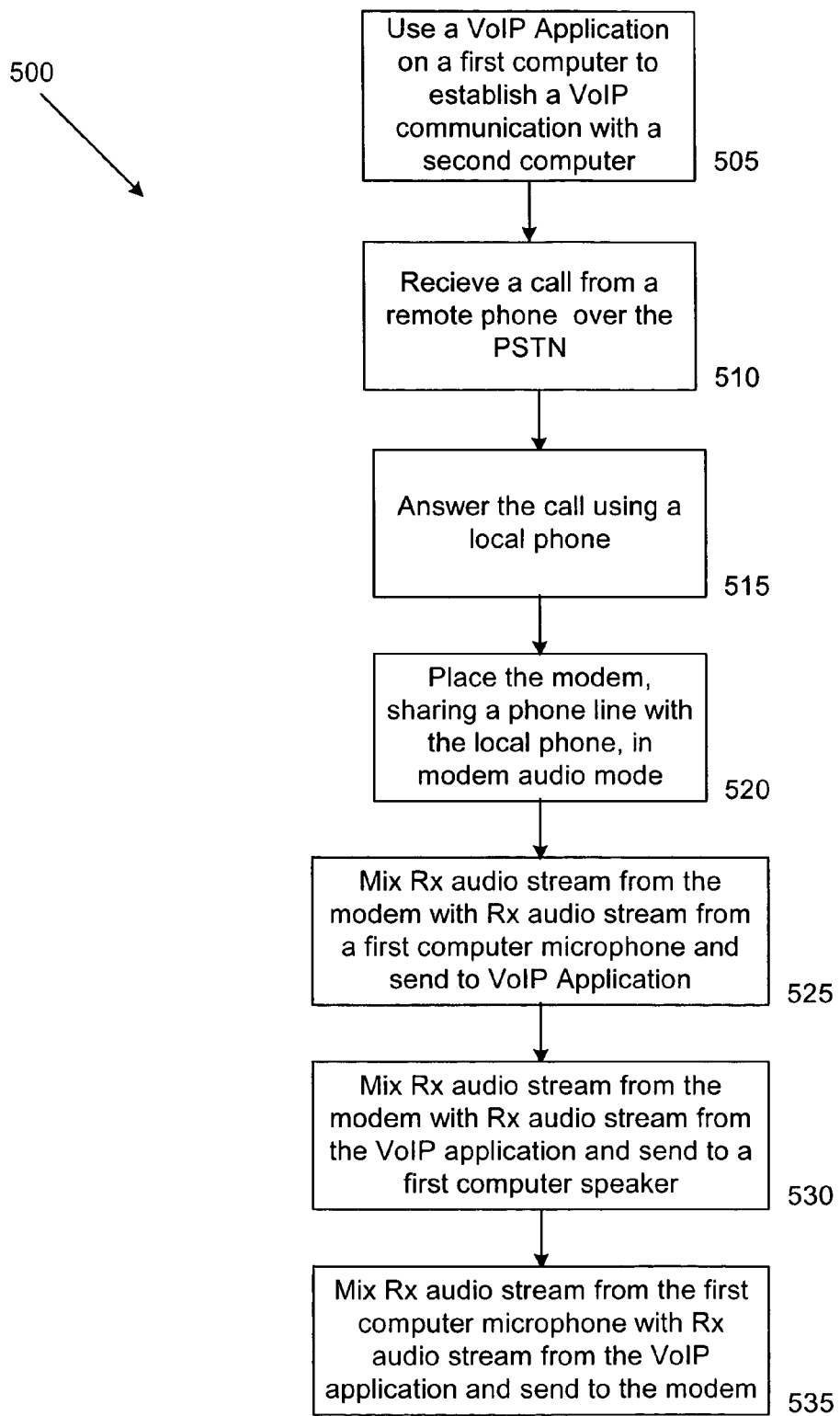
FIG. 5 illustrates a flow diagram of a first VoIP three-way calling method over the PSTN network for use by the VoIP system of FIG. 2, according to one embodiment of the present invention.

FIG. 5 illustrates a flow diagram of first VoIP three-way calling method 500 over PSTN network 270 for use by VoIP system 200, according to one embodiment of the present invention. At step 505, first VoIP application 215 establishes a VoIP connection with second VoIP application 255 establishes over packet network 230. At step 510, a user of first VoIP application 215 receives a call from phone 280 over PSTN network 270 on his PSTN phone line while the user is in communication with VoIP application 255 over packet network 230. Next, at step 515, the user of first VoIP application 215 answers the call from phone 280 using his telephone. At step 520, the user of first VoIP application 215 decides to establish a three-way call between the call from phone 280 over PSTN network 270 and the ongoing call between first VoIP application 215 and second VoIP application 255 over packet network 230. To this end, the user of first VoIP application 215 requests first computer 210 to establish this three-way call, and at step 520, first computer 210 replaces first computer audio subsystem 116 with first modem audio subsystem 217, and places first modem 219 in the audio mode, where first modem 219 shares the PSTN phone line with the user's telephone. Thereafter, first modem 219 goes off-hook and ceases the PSTN phone line, at which point the user may place the user's telephone on-hook.

In order to facilitate the three-way call over packet network 230, at step 525, first modem audio subsystem 217 mixes the audio stream received from first modem 219, which is based on Rx signal 203, with the audio stream received from microphone 201, and sends this mixed audio stream to first VoIP application 215 for transmission over packet network 230. Furthermore, at step 530, first modem audio subsystem 217 mixes the audio stream received from first modem 219, which is based on Rx signal 203, with the audio stream received from first VoIP application 215, and sends this mixed audio stream to speaker 202. Also, at step 535, first modem audio subsystem 217 mixes the audio stream received from microphone 201 with the audio stream received from first VoIP application 215, and sends this mixed audio stream to first modem 219 for transmission via Tx signal 204 to phone 280 over PSTN network 270.

Figure 6:
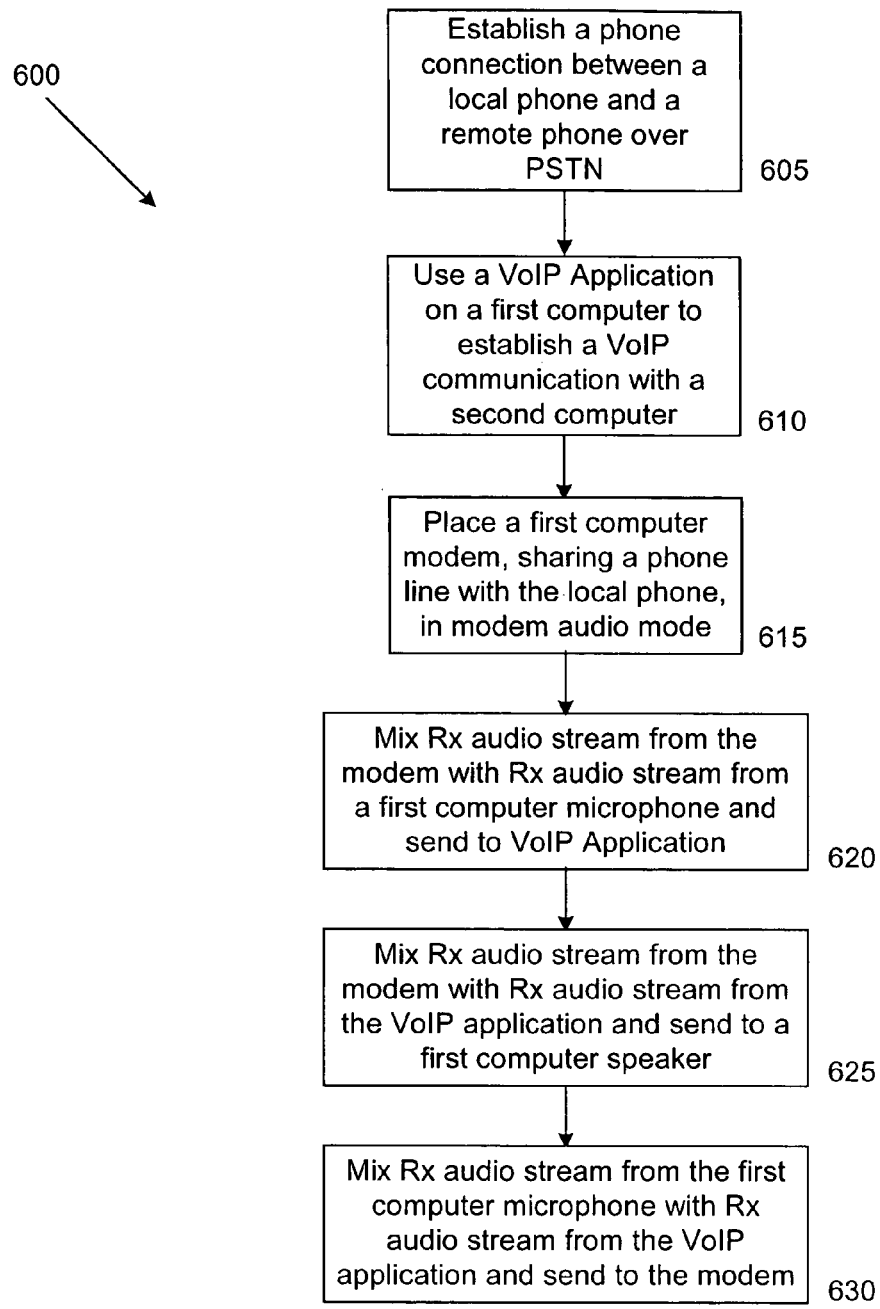
FIG. 6 illustrates a flow diagram of a second VoIP three-way calling method over the PSTN network for use by the VoIP system of FIG. 2, according to one embodiment of the present invention.

FIG. 6 illustrates a flow diagram of second VoIP three-way calling method 600 over PSTN network 270 for use by the VoIP system 200, according to one embodiment of the present invention. At step 605, a first user uses a local phone to place a call to phone 280 over PSTN network 280. While in communication over PSTN network 270, the first user decides to call another over packet network 230 and establish a three-way call, or the first user receives a VoIP call over packet network 230 and decides to establish a three-way call between the PSTN and the VoIP call. To this end, after establishing the VoIP call at step 610, VoIP three-way calling method 600 moves to step 615, where the first user requests first computer 210 to establish this three-way call, and first computer 210 replaces first computer audio subsystem 116 with first modem audio subsystem 217, and places first modem 219 in the audio mode, where first modem 219 shares the PSTN phone line with the first user's telephone. Thereafter, first modem 219 goes off-hook and ceases the PSTN phone line, at which point the user may place the user's telephone on-hook.

In order to facilitate the three-way call over packet network 230, at step 620, first modem audio subsystem 217 mixes the audio stream received from first modem 219, which is based on Rx signal 203, with the audio stream received from microphone 201, and sends this mixed audio stream to first VoIP application 215 for transmission over packet network 230. Furthermore, at step 625, first modem audio subsystem 217 mixes the audio stream received from first modem 219, which is based on Rx signal 203, with the audio stream received from first VoIP application 215, and sends this mixed audio stream to speaker 202. Also, at step 630, first modem audio subsystem 217 mixes the audio stream received from microphone 201 with the audio stream received from first VoIP application 215, and sends this mixed audio stream to first modem 219 for transmission via Tx signal 204 to phone 280 over PSTN network 270.

Figure 7:
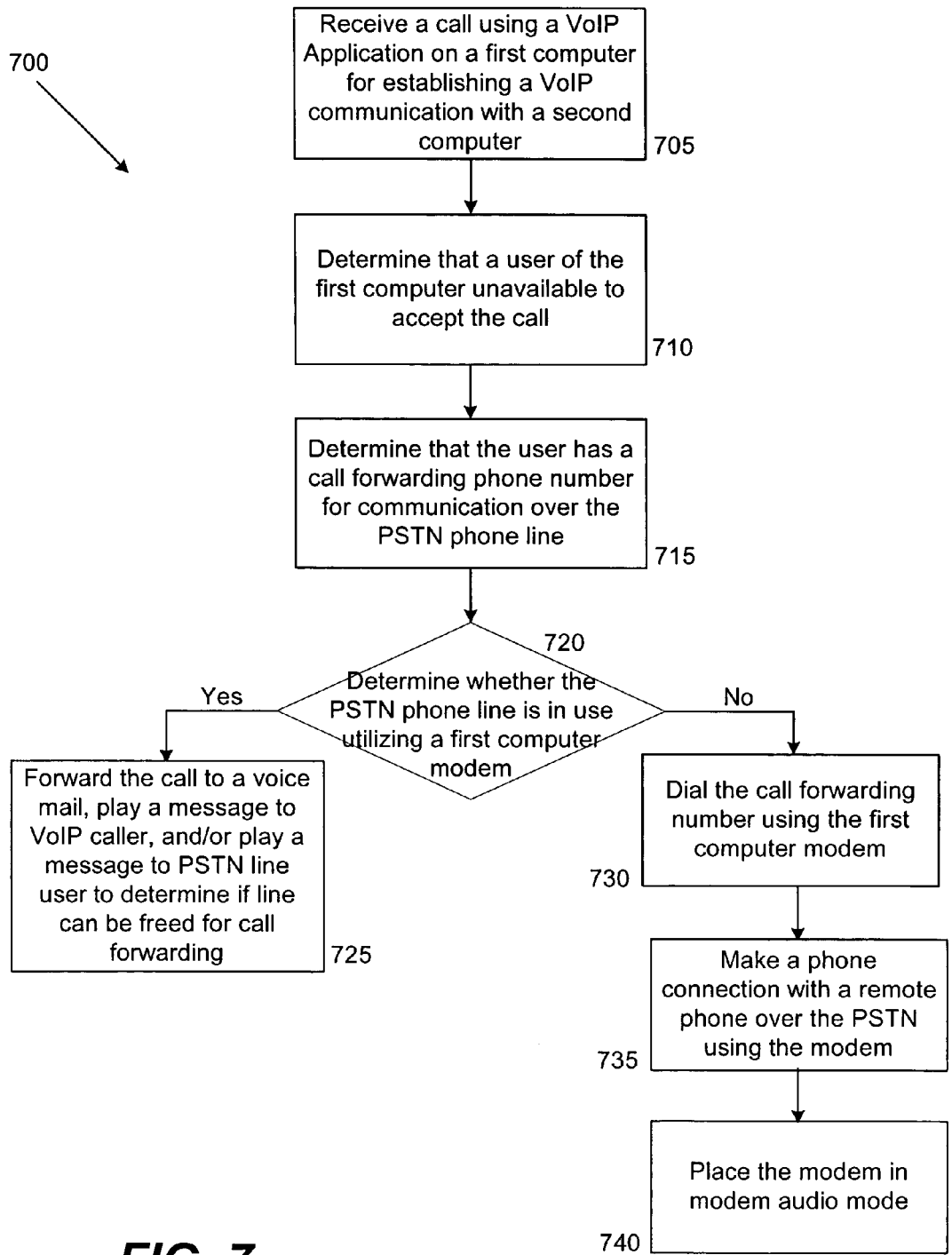
FIG. 7 illustrates a flow diagram of a first PSTN phone line status checking method for use by the VoIP system of FIG. 2, according to one embodiment of the present invention.

FIG. 7 illustrates a flow diagram of first PSTN phone line status checking method 700 for use by VoIP system 200, according to one embodiment of the present invention. At step 705, first VoIP application 215 receives a VoIP call from second VoIP application 255 to establish a VoIP communication session over packet network 230. At step 710, first VoIP application 215 determines that the user of first computer 210 is unavailable to answer the VoIP call after the user does not answer the VoIP call after a certain number of rings or a period of time. Next, at step 715, first call forwarding application 218 determines whether the user has a call forwarding phone number for communication over PSTN network 270, and if so, first call forwarding application 218 requests first modem 219 to place a call to the user over PSTN network 270 at the call forwarding phone number.

At step 720, first modem 219 determines whether the PSTN phone line connected to first modem 219 is off-hook, such as being in use by another communication device, e.g. a facsimile machine, telephone, etc. One of ordinary skilled in the art knows how DAA 350 of modem 320 can be designed to detect whether the PSTN phone line is off-hook. If first modem 219 determines the PSTN phone line connected to first modem 219 is in use, first PSTN phone line status checking method 700 moves to step 725, where first VoIP application 215 may forward the VoIP call to a voice mail, such that the VoIP caller may leave a message, or first VoIP application 215 may play a message for the VoIP caller informing that the user is unavailable, and that at this time the VoIP call cannot be forwarded to the user, because the line is busy but the VoIP may try again shortly. In addition, first VoIP application 215 may cause first modem 219 to go off-hook and play a message in the audio mode for the current user of the PSTN phone line that a VoIP call is waiting to be transferred, and prompt the current user as to whether the current user wishes to terminate its call in view of the VoIP call.

If, however, at step 720, first modem 219 determines the PSTN phone line connected to first modem 219 is not in use, first PSTN phone line status checking method 700 moves to step 730, where first VoIP application 215 uses first modem 219 to dial the call forwarding number of the user on the PSTN phone line. At step 735, the user answers the PSTN call using a wireless or a wireline communication device, such as phone 280. At step 740, first computer 210 places modem 219 in the audio mode, such that the audio stream is communicated between phone 280 and first VoIP application 215 via modem 219 over PSTN network 270. In addition, first computer 210 replaces first computer audio subsystem with first modem audio subsystem 217.

Figure 8:
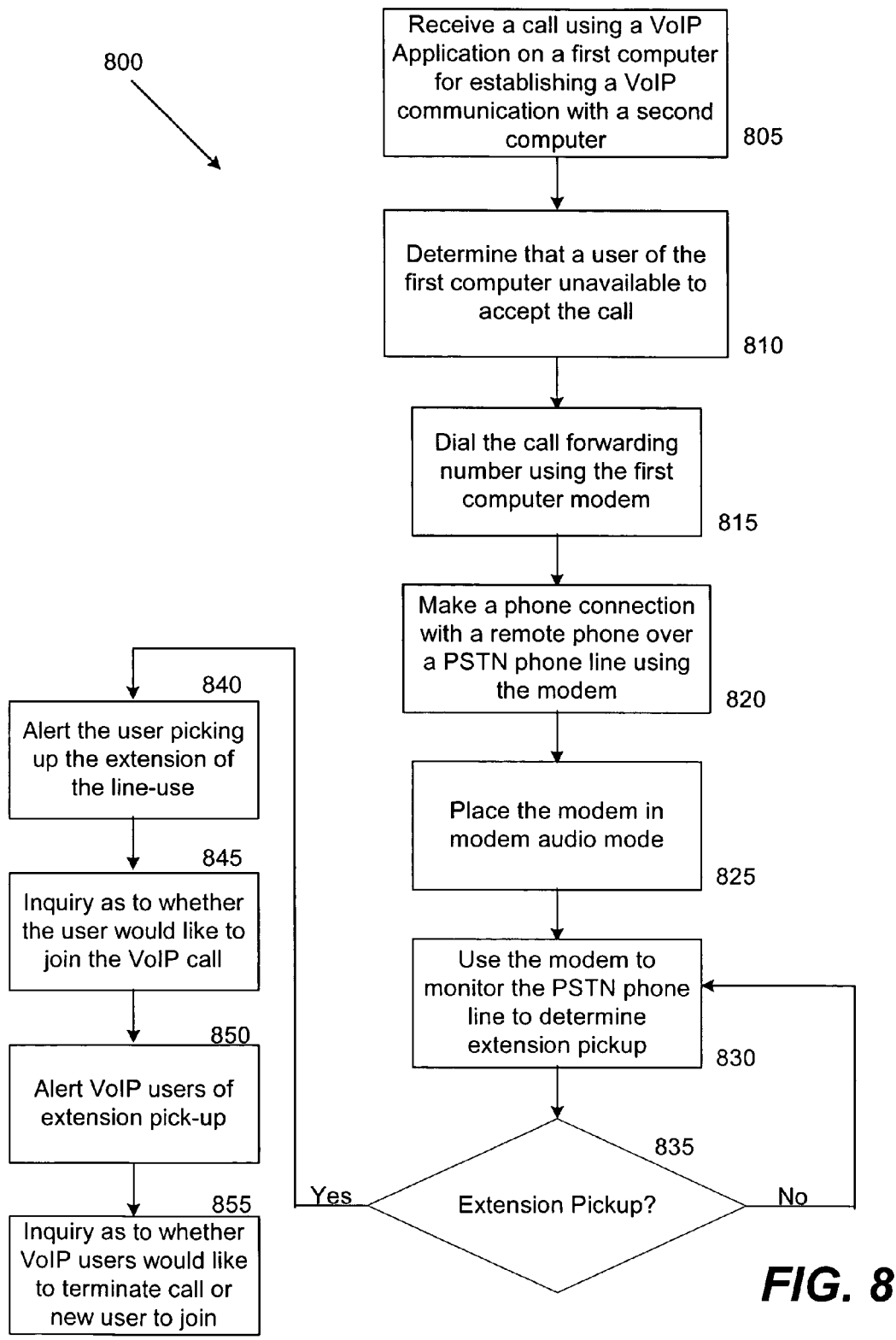
FIG. 8 illustrates a flow diagram of a second PSTN phone line status checking method for use by the VoIP system of FIG. 2, according to one embodiment of the present invention.

FIG. 8 illustrates a flow diagram of second PSTN phone line status checking method 800 for use by VoIP system 200, according to one embodiment of the present invention. At step 805, first VoIP application 215 receives a VoIP call from second VoIP application 255 to establish a VoIP communication session over packet network 230. At step 810, first VoIP application 215 determines that the user of first computer 210 is unavailable to answer the VoIP call after the user does not answer the VoIP call after a certain number of rings or a period of time. Next, at step 815, first call forwarding application 218 determines that the user has a call forwarding phone number for communication over PSTN network 270, and if so, first call forwarding application 218 requests first modem 219 to place a call to the user over PSTN network 270 at the call forwarding phone number, and first modem 219 dials the call forwarding number of the user on the PSTN phone line. At step 820, the user answers the PSTN call using a wireless or a wireline communication device, such as phone 280. At step 825, first computer 210 places modem 219 in the audio mode, such that the audio stream is communicated between phone 280 and first VoIP application 215 via modem 219 over PSTN network 270. In addition, first computer 210 replaces the first computer audio subsystem with first modem audio subsystem 217.

Next, at step 830, first modem 219 begins to monitor the PSTN phone line to detect an extension pick-up, i.e. to determine whether any other device connected to the PSTN phone line goes off-hook. Similar to the above-mentioned line-in-use detection, one of ordinary skilled in the art knows how DAA 350 of modem 320 can be designed to detect whether the PSTN phone line is taken off-hook. If, at step 835, first modem 219 determines that another device connected to the PSTN phone line has gone off-hook, second PSTN phone line status checking method 800 moves to step 840, where first computer 210 alerts such other device taking the PSTN phone line off-hook that the line is currently in use by playing an audio message through first modem 219. At step 845, first computer 210 may inquire as to whether the user of such other device would like to join the VoIP call. Further, at step 850, first computer 210 may alert the VoIP users that another device has gone off-hook or picked up an extension. Next, at step 855, first computer 210 may inquire as to whether the VoIP users would like the new user to join the VoIP call or would like to terminate the VoIP call.

It should be noted that line-in-use detection and extension pick-up steps of first PSTN phone line status checking method 700 and second PSTN phone line status checking method 800, respectively, may be used with other features of VoIP applications and are not limited to use with the call forwarding feature. For example, line-in-use detection and extension pick-up steps may also be used in conjunction with the three-way calling feature.

Figure 9:
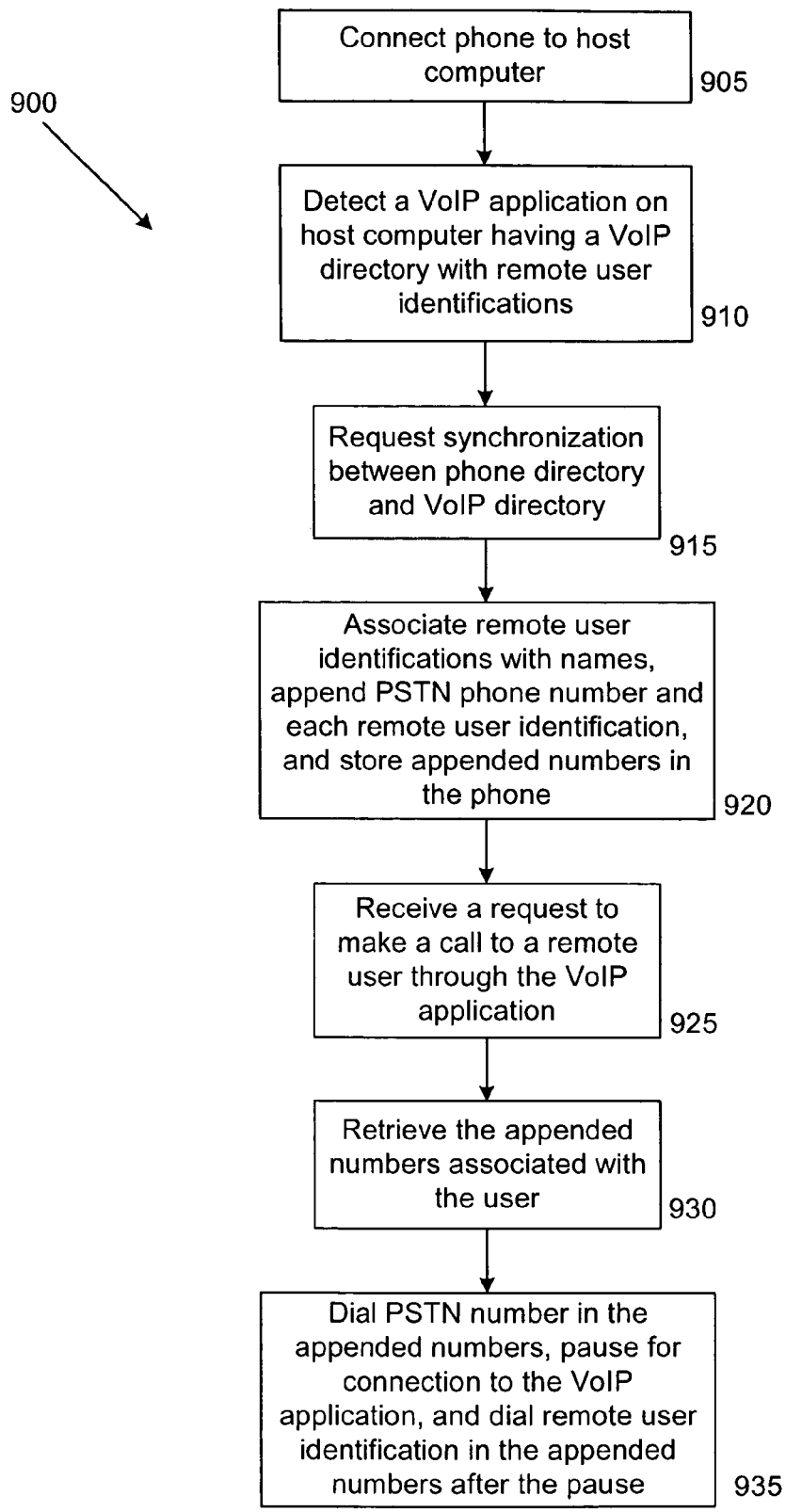
FIG. 9 illustrates a flow diagram of a directory synchronization method for use by the VoIP system of FIG. 2 and a communication device, according to one embodiment of the present invention.

FIG. 9 illustrates a flow diagram of directory synchronization method 900 for use by the VoIP system of FIG. 2 and a communication device, such as a cellular phone, wireless PDA, or the like, according to one embodiment of the present invention. As shown, directory synchronization method 900 begins at step 905, where a cellular phone is connected to first computer 210 via a communication interface, such as a USB port. Next, at step 910, after detecting that the cellular phone has been connected to first computer 210, existence of first VoIP application, having a VoIP directory with remote user identifications, is detected. The VoIP directory may include user names and identification numbers, such as speed dial numbers. For example, first VoIP application 215 directory may use "001" as the speed dial number for the first entry, "002" as the speed dial number for the second entry, and so on. Therefore, to request first VoIP application 215 to make a VoIP call to the remote user in the first entry, "001" should be sent to first VoIP application 215.

At step 915, a directory synchronization request may be sent by the cellular phone. However, the directory synchronization request may also be sent by first computer 210 or first VoIP application 215. In one embodiment, as a result of this request, at step 920, a directory synchronization application (not shown) in the first computer 210 may first copy the directory contents of the cellular phone into first computer 210 memory, and new entries from first VoIP application 215 directory may be added to the copy of the cellular phone directory in first computer 210 memory. Next, for each entry of the cellular phone directory that has a corresponding entry in VoIP application 215 directory, the directory synchronization application may add a new phone number for VoIP application calls. For example, cellular phone directories typically include a home phone number, a cell phone number, and the like, for each name in the directory. In step 920, a VoIP number is added and associated with each name in the copy of the cellular phone directory in first computer 210 memory. In one embodiment, the VoIP number includes the PSTN phone number for calling the originating VoIP application, e.g. phone line connected to first modem 219, and the VoIP identification number for each specific name in the directory, such as "001", is appended to the PSTN phone number. Also, a hard pause or a time delay pause may be inserted between the PSTN phone number and the VoIP identification number, such that sufficient time is provided for first modem 219 to answer the call and provide a prompt for receiving the VoIP identification number. For example, the first VoIP number in the copy of the cellular phone directory may be stored as "1-800-555-1212P001". It should be noted that in other embodiments, the PSTN phone number may be stored in a single location and each of the VoIP identification numbers may be stored in each of the corresponding directory location. Further, at step 920, the edited copy of the cellular phone directory in first computer 210 memory is transmitted to the cellular phone and stored in the cellular phone directory.

Next, at step 925, the cellular phone receives a request to make a call to a remote VoIP user via first VoIP application 215. In response, at step 930, the cellular phone retrieves the appended VoIP number, including the PSTN phone number and the VoIP identification number, for the remote VoIP user from the cellular phone directory. As mentioned above, in other embodiments, the PSTN phone number may not be appended and stored along with the VoIP identification number. In such event, the PSTN phone number and the VoIP identification number are retrieved separately.

At step 935, the cellular phone dials the PSTN number portion of the VoIP number. For example, the cellular phone dials "1-800-555-1212". Next, the cellular phone pauses or delays dialing the VoIP identification number, e.g. when "P" or pause is encountered in the string. After an appropriate amount of time has passed, the cellular phone dials digits "001", which first modem 219 receives over the PSTN phone line, detects the corresponding DTMF tones for "001" and provides digits "001" to first call forwarding application 218, which communicates with first VoIP application 215 for contacting the corresponding remote VoIP user. Accordingly, a user of the cellular phone may effortlessly contact remote VoIP users via the cellular phone directory that is synchronized with the VoIP phone directory to include the PSTN phone number and the VoIP identification number, e.g. appended and stored in the cellular phone directory.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of establishing voice communications over a packet network using a first computer having a first VoIP application, a first modem, a first modem audio subsystem, a microphone and a speaker, the method comprising:
    establishing a VoIP connection with a second VoIP application using the first VoIP application;
    making a phone connection over a phone line using the first modem;
    placing the first modem in an audio mode;
    enabling the first modem audio subsystem to provide a voice communication path between the first modem and the first VoIP application;
    mixing an audio stream received from the first modem with an audio stream received from the microphone to generate a first mix; and
    sending the first mix to the first VoIP application.

2. The method of claim 1 further comprising:
    mixing the audio stream received from the first modem with an audio stream received from the first VoIP application to generate a second mix; and
    sending the second mix to the speaker.

3. The method of claim 1 further comprising:
    mixing the audio stream received from microphone with the audio stream received from the first VoIP application to generate a third mix; and
    sending the third mix to the first modem.

4. The method of claim 1, wherein prior to the making of the phone connection, the method further comprises: dialing a phone number over the phone line using the first modem.

5. The method of claim 1, wherein prior to the making of the phone connection, the method further comprises: answering a call received over the phone line using the first modem.

6. The method of claim 1, wherein the phone connection occurs prior to the VoIP connection.

7. A first computer for establishing voice communications over a packet network, the first computer comprising:
- a first VoIP application configured to establish a VoIP connection with a second VoIP application;
- a first modem configured to make a phone connection over a phone line, wherein the first modem includes an audio mode;
- a first modem audio subsystem configured to provide a voice communication path between the first modem and the first VoIP application;
- a speaker; and
- a microphone;
- wherein the first modem audio subsystem is further configured to mix an audio stream received from the first modem with an audio stream received from the microphone to generate a first mix, and to send the first mix to the first VoIP application.

8. The first computer of claim 7, wherein the first modem audio subsystem is further configured to mix the audio stream received from the first modem with an audio stream received from the first VoIP application to generate a second mix, and to send the second mix to the speaker.

9. The first computer of claim 7, wherein the first modem audio subsystem is further configured to mix the audio stream received from microphone with the audio stream received from the first VoIP application to generate a third mix, and to send the third mix to the first modem.

10. The first computer of claim 7, wherein prior to making the phone connection, the first modem dials a phone number over the phone line.

11. The first computer of claim 7, wherein prior to making the phone connection, the first modem answers a call received over the phone line.

12. The first computer of claim 7, wherein the phone connection occurs prior to the VoIP connection.

13. A method of establishing voice communications over a packet network using a first computer having a first VoIP application, a first modem, a microphone and a speaker, the method comprising:
- establishing a VoIP connection with a second VoIP application using the first VoIP application;
- determining that the VoIP connection is to be forwarded via a phone line to a first user;
- requesting the first modem to dial a phone number for the first user in response to determining that the VoIP connection is to be forwarded;
- determining whether the phone line is in use by a second user using the first modem;
- dialing the phone number using the first modem only if the first modem determines that the phone line is not in use;
- making a phone connection over a phone line using the first modem; and
- providing a voice communication path between the first modem and the first VoIP application.

14. The method of claim 13, wherein if the first modem determines that the phone line is in use by the second user, the second user is alerted about the VoIP connection.

15. The method of claim 13, wherein after providing the communication path, the method further comprises: monitoring the phone line using the first modem to determine if a communication device connected to the phone line goes off-hook.

16. The method of claim 15, wherein the monitoring the phone line determines that the communication device connected to the phone line has gone off-hook, and the method further comprises:
- alerting the communication device that the VoIP connection is in progress; and
- inquiring whether the communication device is to join the VoIP connection.

17. The method of claim 15, wherein the monitoring the phone line determines that the communication device connected to the phone line has gone off-hook, and the method further comprises:
- alerting users of the VoIP connection that the communication device has gone off-hook; and
- inquiring whether the communication device is to join the VoIP connection.

18. A first computer for establishing voice communications over a packet network, the first computer comprising:
- a first VoIP application configured to establish a VoIP connection with a second VoIP application, wherein the first VoIP application is further configured to determine that the VoIP connection is to be forwarded via a phone line to a first user; and
- a first modem configured to receive a request for dialing a phone number for the first user in response to the first VoIP application determining that the VoIP connection is to be forwarded, wherein the first modem is further configured to determine whether the phone line is in use by a second user, and wherein the first modem is further configured to dial the phone number only if the first modem determines that the phone line is not in use, make a phone connection over a phone line and provide a voice communication path to the first VoIP application.

19. The first computer of claim 18, wherein if the first modem determines that the phone line is in use by the second user, the second user is alerted about the VoIP connection.

20. The first computer of claim 18, wherein after providing the communication path, the first modem monitors the phone line to determine if a communication device connected to the phone line goes off-hook.

21. The first computer of claim 20, wherein the first modem determines that the communication device connected to the phone line has gone off-hook, and the first computer alerts the communication device that the VoIP connection is in progress and inquires whether the communication device is to join the VoIP connection.

22. The first computer of claim 20, wherein the first modem determines that the communication device connected to the phone line has gone off-hook, and the first computer alerts users of the VoIP connection that the communication device has gone off-hook and inquiring whether the communication device is to join the VoIP connection.

* * * * *